Jan. 4, 1949.   H. C. STAEHLE   2,458,439
METHOD OF MAKING PHOTOGRAPHIC IMAGES ON PLASTIC
Filed May 15, 1946

Henry C. Staehle
INVENTOR
BY
ATTORNEYS

Patented Jan. 4, 1949

2,458,439

UNITED STATES PATENT OFFICE 2,458,439

METHOD OF MAKING PHOTOGRAPHIC IMAGES ON PLASTIC

Henry C. Staehle, Rochester, N. Y., assignor to Eastman Kodak Company, Rochester, N. Y., a corporation of New Jersey Application May 15, 1946, Serial No. 669,918

1 Claim. (Cl. 41—24)

The present invention relates to a method of preparing photographic images on plastics.

In the past, photographic images were prepared on plastics, such as "Lucite' and "Plexiglas," by first laminating a film, such as a Cine Positive, base side down on the plastic and using a solvent type of cement. This film was then exposed, developed, washed and dried, after which a second film was laminated down on the image. This second film had to be either subbed or gel coated, and cemented down with a water type of cement. The first lamination could also be carried out with a film which had already been processed; but, in any case, this procedure required two laminating operations. The second lamination was invariably susceptible to swelling with water and possible stripping when subjected to high humidity and high temperature.

The present invention provides a method by which a photographic relief image may be applied to a plastic in a single lamination, resulting in a complete waterproof sandwich for the relief image. This procedure is adapted for use with plastic sheeting of cellulose acetate, or sheets of methyl methacrylate sold under the trade names of "Lucite" or "Plexiglas." The image is first formed, in a manner to be later described, so that the part of the film not occupied by the image consists of clear film base. The film is then laminated, emulsion side down, on the plastic sheet with a solvent type of cement. In this case, a tight, waterproof bond is provided between the non-image areas of the film base and the plastic sheet. Obviously, this method would be limited to images such as lines, where relatively small portions of the total area of the film constitute the image. It is further limited by the fact that the film must necessarily be processed before lamination hence, making precision registration practically out of the question. However, for many purposes, the method of lamination of the present invention will be found superior to the prior methods which involve double lamination.

The present invention has, therefore, as its principal object, the provision of a method of lamination by which a relief image may be laminated to a sheet of plastic in a single laminating operation.

A still further object of the invention is the provision of a method of laminating a relief image to a sheet of plastic with a cement which adheres the film base but not the image portion of the film to the plastic sheet.

Yet another object of the invention is the provision of a method of laminating a relief image to a sheet of plastic so that the image is positioned in a waterproof sandwich between the film base and the plastic sheet.

To these and other ends, the invention resides in certain improvements and combinations of parts, all as will be hereinafter more fully described, the novel features being pointed out in the claim at the end of the specification.

Figure 1:
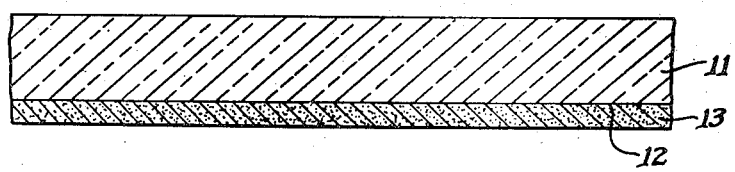
Fig. 1 is a sectional view through an unexposed photographic film showing the relation of the film base and the sensitized photographic emulsion.

Fig. 1 shows a photographic film having a transparent base 11 on one surface 12 of which is a gelatin photographic emulsion 13. As such films are well known, further details thereof are not deemed necessary for a complete understanding of the present invention.

Figure 2:
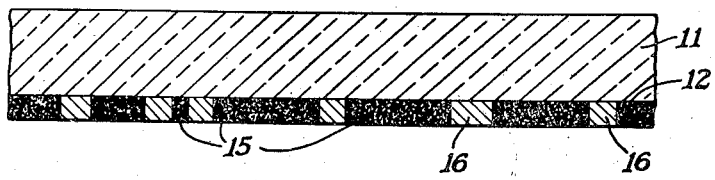
Fig. 2 shows the photographic film of Fig. 1 after exposure and processing to a negative.
Figure 3:
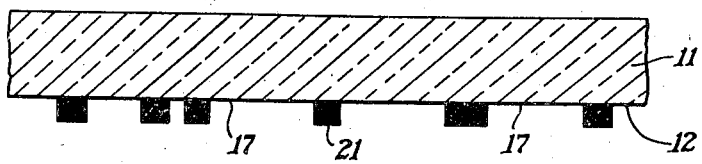
Fig. 3 shows the film of Fig. 2 reexposed and processed to provide a positive relief image.

These films may be exposed in a camera, or in any other suitable and well-known manner, and then developed to a negative, as shown in Fig. 2. This negative has portions 15 which have been exposed to light and, hence, are dark, and also portions 16, representing the lines in the original. These line portions 16 obviously have not been exposed to light so that in the negative they appear as white or clear lines. Thus, in the negative, the parts 16 representing the lines are white or clear, while the remaining portions 15 are black or dark, due to the exposed silver grains. This negative is then etched in a peroxide bath to remove all the gelatin and silver which has been exposed, namely the portions 15. Upon removal of these developed portions 15, the surface 12 of the film base 11 is exposed at all points 17 except those representing the lines, portion 16, the later comprising unexposed silver halide grains in the emulsion. These unexposed portions 16 are then exposed and developed. This exposure causes the silver halide in the portions 16 to change to silver and thus become black or dark to provide a positive image in relief, as shown in Fig. 3. These line portions 16 may be suitably dyed if desired. Thus a positive relief film is formed, and this image is an exact reproduction of the original. However, as the formation of relief images are old and do not constitute per se a part of the present invention, a further detailed discussion is not deemed necessary to those in the art.

Figure 4:
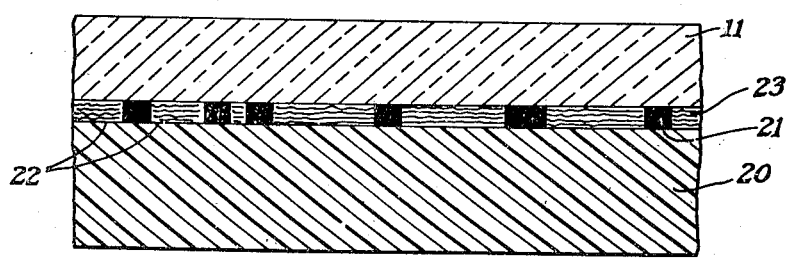
Fig. 4 shows the positive relief image of Fig. 3 secured in sandwiched relation to a sheet of plastic material.

This positive relief image is then mounted on a plastic sheet 20 of any suitable material, but it has been found that sheets of cellulose acetate or methyl methacrylate resin are admirably adapted to the laminating operation of the present invention. Such methyl methacrylate resin sheets are sold under the trade name of "Lucite" or "Plexiglas." In order to secure the image-bearing surface of face 12 of the film to the plastic sheet 20, the film 11 is placed emulsion side down on the sheet 20 with the surfaces 21 of the relief image 16 in contact with the face 22 of the plastic sheet 20, as shown in Fig. 4. A cement 23 of the solvent type is then used to adhere the exposed parts or portions 17 of the base 11 to the face or surface 22 of the sheet 20. As the film base 11 can be laminated to the plastic sheet 20 but the gelatin relief-image portions 16 cannot, the cement 23 is of the type which will give a strong bond between the exposed base portions 17 and the plastic sheet 20, but is incompatible with the image-bearing portions 16, so that only the film base is adhered to the plastic sheet 20. Thus, only the base of the film and the plastic sheet are cemented together, and the image-bearing portions 16 are sandwiched in a tight waterproof bond between the base 11 and the sheet 20, as is apparent from an inspection of Fig. 4.

The particular type of cement used depends, of course, on the composition of both the base 11 and the plastic sheet 20. With either nitrate or acetate base and a plastic sheet of cellulose acetate or methyl methacrylate, a cement consisting of 2 per cent nitro-cellulose dissolved in a solvent of 50 per cent ethylene chloride and 50 per cent methyl alcohol, has been found to be satisfactory.

By means of the above arrangement, the relief gelatin image-bearing portions 16 are laminated in a tight, waterproof manner between the film base 11 and the plastic sheet 20. The cement 23 serves to adhere the exposed portions 17 of the base 11 but not the gelatin image portions 16 to the surface 21 of the plastic sheet 20. Thus the laminating operation can be performed in one step rather than in two, as in prior methods.

While one embodiment of the invention has been disclosed, it is to be understood that the inventive idea may be carried out in a number of ways. This application is, therefore, not to be limited to the precise details described, but is intended to cover all variations and modifications falling within the scope of the appended claim.

I claim:

A method of preparing an image on a plastic sheet of methyl-methacrylate comprising, providing a transparent film base of a cellulose ester having a positive gelatine emulsion relief image formed on one surface thereof, the portions of said surface not occupied by said image having the emulsion removed therefrom to expose said base, and cementing said base to said sheet with a cement comprising nitro-cellulose dissolved in ethylene chloride and methyl alcohol to adhere said portions to said sheet.

HENRY C. STAEHLE.

REFERENCES CITED

The following references are of record in the file of this patent:

UNITED STATES PATENTS

| Number | Name | Date |
|--------|------|------|
| 458,020 | France | Aug. 18, 1891 |
| 1,802,448 | Sorge | Apr. 28, 1931 |
| 1,885,345 | Guthrie | Nov. 1, 1932 |
| 1,961,335 | Cheney | June 5, 1934 |